May 4, 1965  T. H. BURGESS ETAL  3,182,114
RECTIFIER UNIT WITH HEAT DISSIPATOR
Filed Jan. 4, 1963
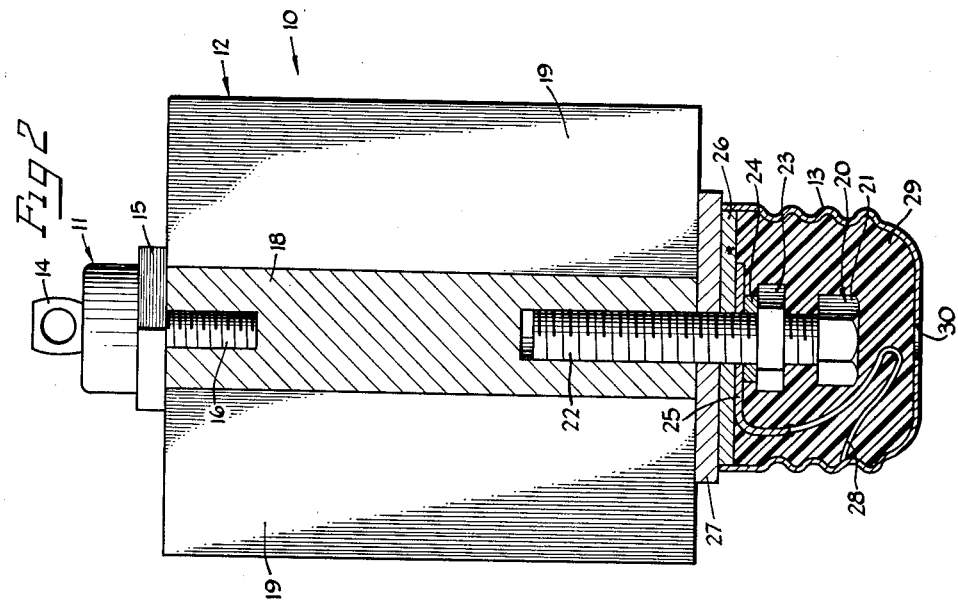
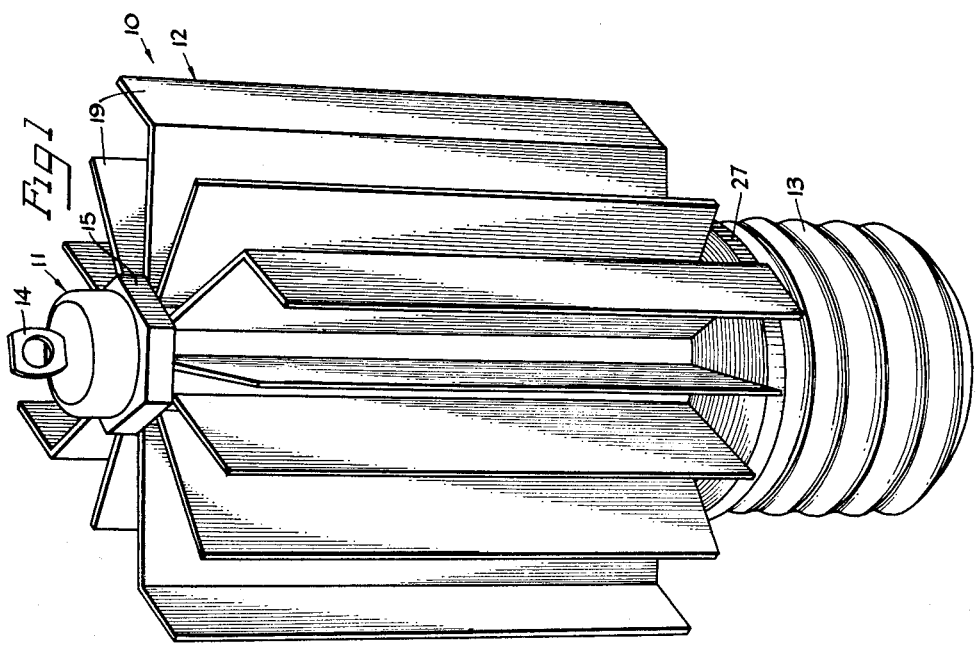
INVENTORS
Maurits P. Kesnar
Thomas H. Burgess
BY
ATTORNEYS

United States Patent Office 3,182,114
Patented May 4, 1965

3,182,114
RECTIFIER UNIT WITH HEAT DISSIPATOR
Thomas H. Burgess, Little Rock, Ark., and Maurits P. Kesnar, Granite City, Ill., assignors to Fan Tron Corporation, Little Rock, Ark., a corporation of Arkansas
Filed Jan. 4, 1963, Ser. No. 266,770
(Filed under Rule 47(a) and 35 U.S.C. 116)
3 Claims. (Cl. 174—15)

This invention relates to a rectifier unit and more particularly to a rectifier unit which is simple, compact and rugged in construction and highly efficient and safe in operation, and which can be readily installed and removed from an apparatus in which it is used.

The invention was evolved with the general object of providing a solid state rectifier unit, such as a silicon diode, for direct replacement of tungar or mercury vapor tube rectifiers, to obtain improved performance characteristics and other advantages which are possible with solid state rectifiers. It will be understood, however, that many features of the invention may be applied to rectifier units designed for use other than for replacement.

An important feature of the invention relates to the mounting of a rectifier element on one end of a central portion of a heat radiating member having a plurality of fins projecting radially from the central portion, with the other end of the central portion being secured to a base for mounting in a socket.

Another important feature of the invention relates to an arrangement for rigidly securing the heat radiating member to the base.

This invention contemplates other and more specific objects, features and advantages which will become more fully apparent from the following detailed description taken in conjunction with the accompanying drawing which illustrates a preferred embodiment and in which:

FIGURE 1 is a perspective view of a rectifier unit constructed according to the principles of this invention; and FIGURE 2 is a vertical section through the unit of FIGURE 1.

Reference numeral 10 generally designates a rectifier unit constructed according to this invention. In general, the unit 10 includes a solid state rectifier element 11, preferably a silicon diode, a heat radiating member 12 and a base 13 adapted to be inserted in a socket. The illustrated unit 10 was particularly designed for direct replacement of tungar or mercury vapor tube rectifiers having screw bases to obtain improved performance characteristics, durability and other advantages of the solid state rectifier. The unit 10 is particularly advantageous in that it is simple, compact and rugged in construction while having a high efficiency, particularly with regard to conducting and dissipating heat away from the rectifier element 11 to obtain safe, efficient operation thereof. It will be understood that the invention is not limited to the use of the unit as a replacement.

The illustrated rectifier element 11 is a silicon diode and it comprises a top apertured terminal 14 to which a suitable connector may be attached and a housing and base portion 15 having the peripheral shape of a hexagonal nut and having an integral threaded shank portion 16.

Shank portion 16 is screwed into an internally threaded aperture in a central portion 18 of the heat radiating member 12 which is preferably metal and most preferably blank anodized aluminum to obtain a high heat radiation efficiency.

To increase heat dissipation, the member 12 has a plurality of integral fins 19, twelve as illustrated, which extend radially outwardly from the central portion 18 in generally equi-angularly spaced relation. As illustrated, all of the fins 19 have an axial length equal to the length of the central portion 18, and the radial dimension of all of the fins 19 is approximately the same, to obtain a high efficiency of heat radiation relative to the overall volume occupied by the unit. In the illustrated unit, the fins terminate at edges lying in planes which define a volume of square cross-section, but other configurations may be used. The member 12 with the integral fins 19 additionally serves as a handle for the unit which may be readily grasped by the hand when the unit is installed.

To secure the heat radiating member 12 to the base 13 and also to provide an electrical connection therebetween, a bolt or screw 20 is provided having a head portion 21 and a threaded shank portion 22 extending through a nut 23, a lock washer 24, a solder terminal 25, and large washers 26 and 27, the shank portion 22 being screwed into the lower end of the central portion 18 of the member 12.

In constructing the device, the parts 22–27 are first assembled and the nut 23 is tightened to hold them in firm interengagement. A wire 28, preferably stranded, is soldered at one end to the terminal 25 and at the other end to a point on the inside of the base 13. The assembly is then positioned as illustrated with the washer 26 fitted inside the base 13 and with the washer 27 resting on top of the base. The washer 26 may then be secured in position, as by soldering, or in the alternative or in addition, the base may be filled with a suitable resin or plastic 29, from an opening 30 in the bottom of the base 13. When the resin or plastic sets, the bolt or screw 22 and other parts are then firmly locked in position. There is provided therefore a rectifier unit which is simple, compact and rugged in construction while having a high degree of efficiency.

With regard to the base 13, it is noted that a screw type base is illustrated, but it may also be of a different type such as a bayonet type, as required or desired.

It will be understood that other modifications and variations may be effected without departing from the spirit and scope of the novel concepts of this invention.

We claim as our invention:
1. In a rectifier unit,
   a heat radiating member having an elongated central portion and a plurality of fins projecting radially outwardly from said central portion,
   a generally cylindrical base secured to one end of said heat radiating member in axial alignment with said central portion and adapted to be inserted in a socket,
   and a solid state rectifier at the opposite end of said heat radiating member including a base portion having an integral screw projecting therefrom and threaded into said central portion.
2. In a rectifier unit,
   a heat radiating member,
   a solid state rectifier unit secured to one end of said heat radiating member,
   a generally cylindrical hollow metal base, a plastic material in said hollow base, a screw having a head portion embedded in said plastic material,
   and a shank portion threaded into the other end of said heat radiating member.
3. In a rectifier unit,
   a heat radiating member,
   a solid state rectifier unit secured to one end of said heat radiating member,
   a generally cylindrical hollow metal base,
   a plastic material in said hollow base,
   a screw having a head portion embedded in said plastic material,
   a shank portion threaded into the other end of said heat radiating member, and means including a wire soldered to the inside of said hollow metal base for electrically connecting said screw to said base.

References Cited by the Examiner

UNITED STATES PATENTS

| | | | |
|---|---|---|---|
| D. 194,787 | 3/63 | Chadwick. | |
| 1,568,727 | 1/26 | Frank | 174—16 X |
| 1,908,316 | 5/33 | Bush | 174—16 X |
| 3,018,424 | 1/62 | Colaiaco | 317—100 X |
| 3,023,264 | 2/62 | Allison | 165—80 |

LARAMIE E. ASKIN, *Primary Examiner.*

JOHN P. WILDMAN, E. JAMES SAX, *Examiners.*